United States Patent
Watanabe et al.

[11] Patent Number: 5,995,182
[45] Date of Patent: Nov. 30, 1999

[54] LIQUID CRYSTAL DISPLAY WITH LIGHT SHIELD CONTAINING DISCONTINUOUS METAL PATTERN AND NONCONDUCTIVE OPAQUE RESIN

[75] Inventors: Makoto Watanabe; Osamu Sukegawa, both of Tokyo, Japan

[73] Assignee: NEC Corporation, Tokyo, Japan

[21] Appl. No.: 08/872,739

[22] Filed: Jun. 11, 1997

[30] Foreign Application Priority Data

Jun. 11, 1996 [JP] Japan .................................. 8-149023

[51] Int. Cl.⁶ .................... G02F 1/1333; G02F 1/1343
[52] U.S. Cl. ................ 349/110; 349/111; 349/141
[58] Field of Search .................. 349/111, 141, 349/110

[56] References Cited

U.S. PATENT DOCUMENTS

| | | | |
|---|---|---|---|
| 4,569,574 | 2/1986 | Masaki et al. | 349/111 |
| 4,733,948 | 3/1988 | Kitahara | 349/111 |
| 5,032,883 | 7/1991 | Wakai et al. | 349/39 |
| 5,039,204 | 8/1991 | Choi | 349/111 |
| 5,083,853 | 1/1992 | Ueki et al. | 349/111 |
| 5,128,786 | 7/1992 | Yanagisawa | 349/111 |
| 5,598,285 | 1/1997 | Kondo et al. | 349/141 |
| 5,796,448 | 9/1998 | Kim | 349/39 |

FOREIGN PATENT DOCUMENTS

| | | |
|---|---|---|
| 63-21907 | 5/1988 | Japan . |
| 7230074 | 8/1995 | Japan . |

Primary Examiner—William L. Sikes
Assistant Examiner—Kari M. Horney
Attorney, Agent, or Firm—Sughrue, Mion, Zinn, Macpeak & Seas, PLLC

[57] ABSTRACT

An active matrix liquid crystal display having first and second substrate portions, a liquid crystal layer (#107) held therebetween, and a light-shielding metal film (#401) arranged in the second substrate portion in a matrix pattern and split into a plurality of film pieces (#401a and #401b) electrically isolated from one another. The matrix pattern is partitioned into each frame defined by two pairs of opposite ones of the film pieces. A nonconductive opaque resin (#402) is formed in a gap between the metal film patterns.

10 Claims, 13 Drawing Sheets

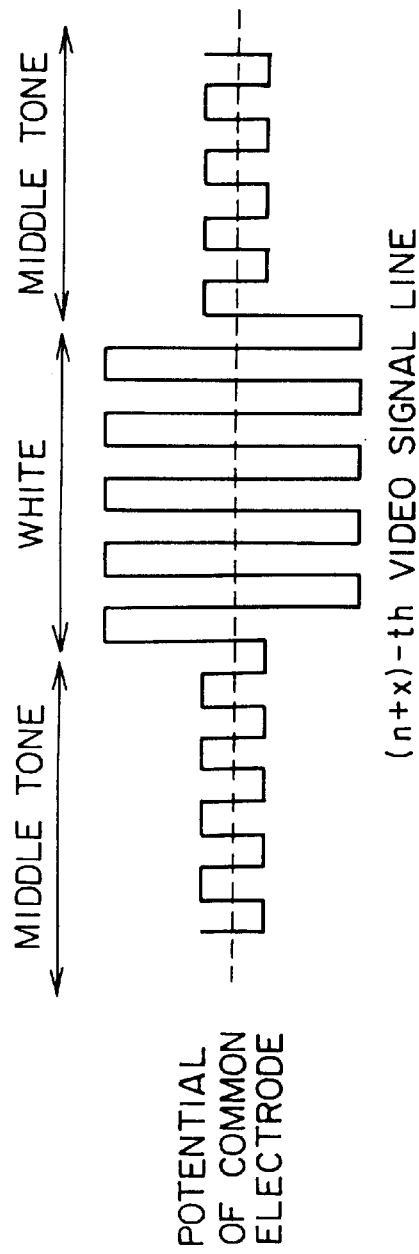
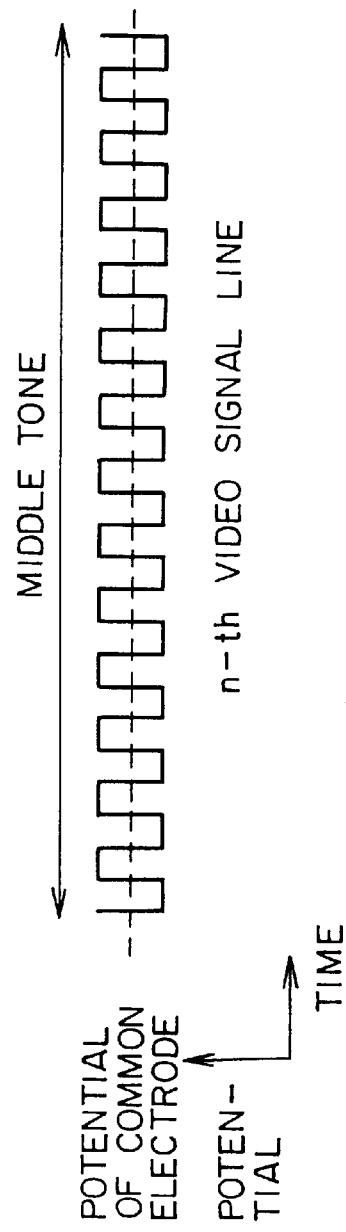

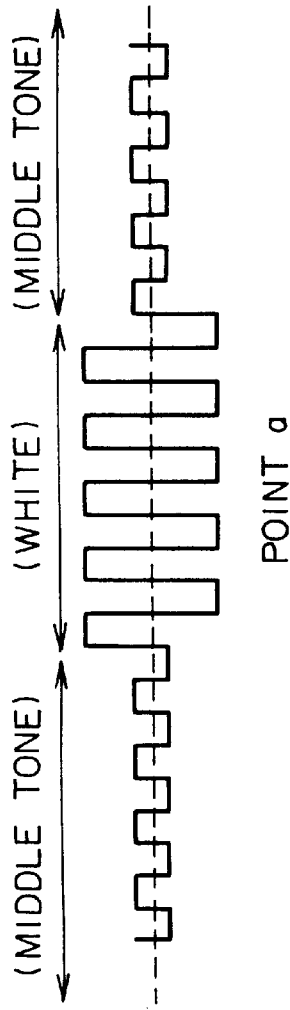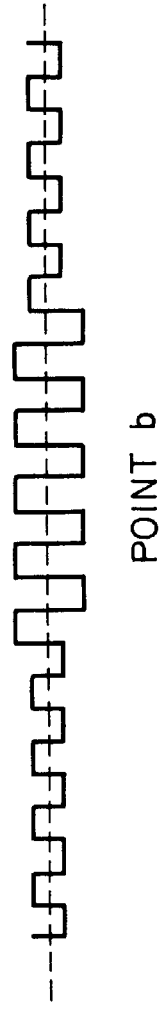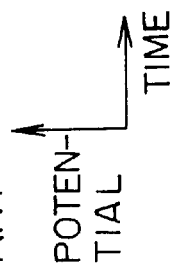
FIG. 9A PRIOR ART
FIG. 9B PRIOR ART
FIG. 9C PRIOR ART

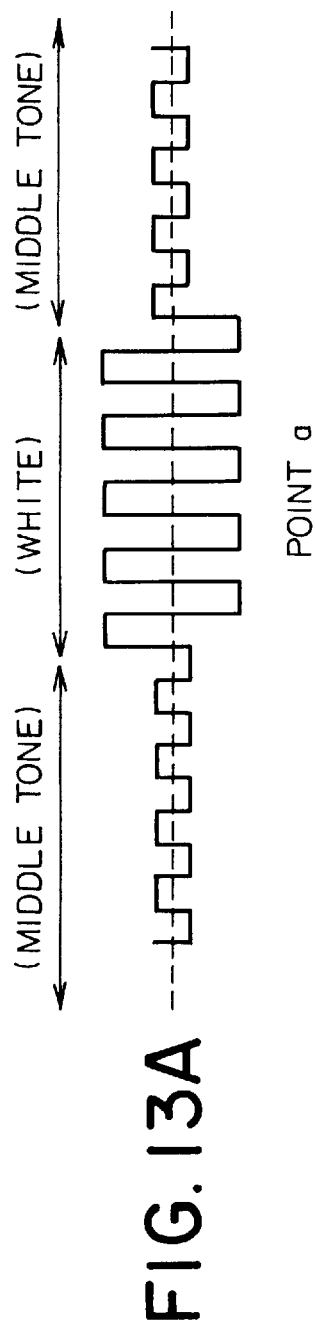
FIG. 13A POINT a
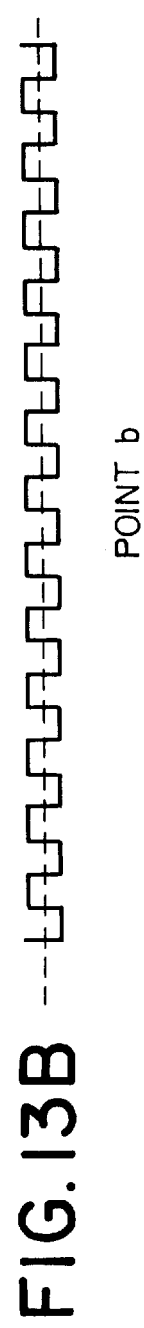
FIG. 13B POINT b
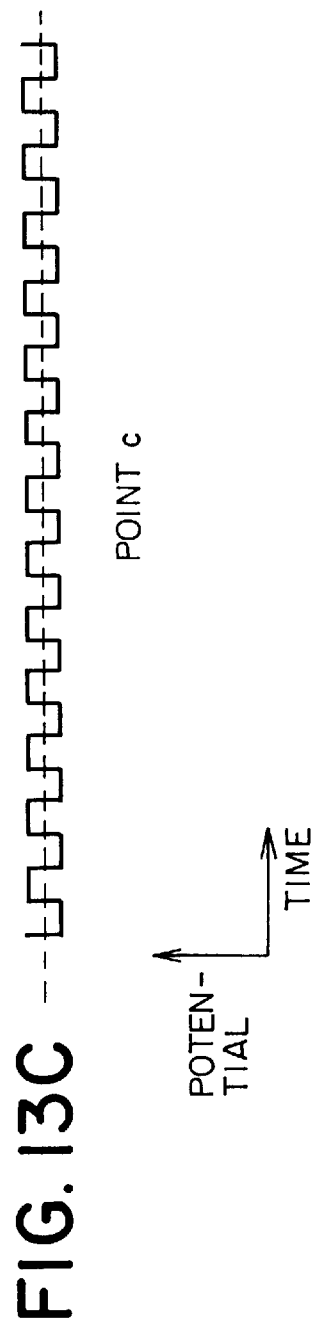
FIG. 13C POINT c

LIQUID CRYSTAL DISPLAY WITH LIGHT SHIELD CONTAINING DISCONTINUOUS METAL PATTERN AND NONCONDUCTIVE OPAQUE RESIN

BACKGROUND OF THE INVENTION

This invention relates to an active matrix liquid crystal display and, in particular, to an active matrix liquid crystal display of an IPS (In-Plane Switching) type.

In a liquid crystal display, an electric field is applied to a liquid crystal layer. To apply the electric field, various driving systems are known in the art. One such system is a static driving system in which a constant voltage signal is applied for each individual pixel to activate liquid crystals corresponding thereto. However, if the liquid crystal display has a large display capacity, the static driving system requires an enormously large number of signal lines and is not practically applicable.

Instead, a multiplex driving system is applied to the liquid crystal display of such a large display capacity. In the multiplex driving system, a signal voltage is supplied through a common signal line in a time division fashion. The multiplex driving system is classified into several types. Among others, an active matrix type using an active element in each pixel is known for its excellent display quality. The active matrix type is further classified into two types according to directions of the electric field applied to the liquid crystal layer. Specifically, one type is to apply the electric field in a direction perpendicular to glass substrates between which the liquid crystal layer is interposed. The other type is to apply the electric field in a direction parallel to the glass substrates and is therefore called an in-plane switching type (hereafter abbreviated to an IPS type). Such an IPS type is disclosed, for example, in Japanese Patent Publication (JP-B) No. 21907/1988. The IPS type is particularly adapted to a large-scale monitor because of its wide viewing angle.

At first, description will be made about the structure of a conventional active matrix liquid crystal display of an IPS type.

The conventional liquid crystal display comprises a first substrate portion with thin film transistors (sometimes abbreviated to TFT) formed therein, a second substrate portion opposite to the first substrate portion, and a liquid crystal layer held between the first and the second substrate portions.

The first substrate portion comprises a first glass substrate. A common electrode layer is formed or patterned on an inner surface of the first glass substrate that faces the liquid crystal layer. An insulator film is formed over the inner surface of the first glass substrate and the common electrode layer. On the insulator film, a video signal line layer and a pixel electrode layer are formed in a predetermined pattern. A protective insulator film is formed over the insulator film, the video signal line layer, and the pixel electrode layer. Over the protective insulator film, a first orientation film is formed to cause orientation in the liquid crystal layer. The first orientation film is prepared by rubbing treatment in a predetermined rubbing direction.

On the other hand, the second substrate portion comprises a second glass substrate. A light-shielding opaque metal film is formed in a matrix pattern on an inner surface of the second glass substrate that faces the liquid crystal layer. A second orientation film is formed over the inner surface of the second glass substrate and the opaque metal film. The second orientation film serves to cause orientation in the liquid crystal layer and is prepared by rubbing treatment in the predetermined rubbing direction like the first orientation film. The opaque metal film formed in the matrix pattern serves to prevent leakage of light in the liquid crystal display and is often called a black matrix.

Liquid crystals are confined between the first and the second substrate portions to form the liquid crystal layer. Finally, a first polarization plate is attached to an outer surface of the first glass substrate with its transmission axis coincident with the predetermined rubbing direction. On the other hand, a second polarization plate is attached to an outer surface of the second glass substrate with its transmission axis perpendicular to that of the first polarization plate.

Next, description will be made as regards operation of the liquid crystal display having the above-mentioned structure.

The first substrate portion further comprises a scanning signal line layer and a plurality of thin film transistors including a semiconductor layer. The scanning signal line layer comprises a plurality of scanning signal lines extending in a first direction. On the other hand, the video signal line layer comprises a plurality of video signal lines extending in a second direction perpendicular to the first direction. The pixel electrode layer comprises a plurality of pixel electrodes connected to the thin film transistors in one-to-one correspondence. Each of the thin film transistors is connected to one of the scanning signal lines and one of the video signal lines. In response to an ON/OFF signal from the scanning signal line layer, each of the thin film transistors including the semiconductor layer is turned on and off. When a particular one of the thin film transistors is turned on, electric charges flow from a corresponding one of the video signal lines to a corresponding one of the pixel electrodes. In response, those liquid crystals in a corresponding part of the liquid crystal layer are activated. Even after the thin film transistor is turned off, the electric charges flowing into the corresponding pixel electrode are maintained to keep a certain electric potential. Therefore, the liquid crystals are kept activated. On the other hand, the common electrode layer is continuously applied with a predetermined d.c. voltage.

The above-mentioned conventional liquid crystal display is disadvantageous as described in the following.

By way of example, consideration will be made about the case where a white window on a middle tone background is displayed. In this event, nonuniformity in luminance is caused in the middle tone background. Specifically, local difference in luminance is caused to occur although the uniform luminance is intended throughout the middle tone background. Such nonuniformity in luminance occurs in the manner which will hereafter be described.

Due to capacitive coupling present between the video signal line layer and the opaque metal film, the opaque metal film is subjected to potential modulation following potential variation of a video signal. This results in disturbance of a horizontal electric field applied to the liquid crystal layer. Since the opaque metal film is formed in the matrix pattern, the potential modulation concentrically spreads around a modulation point. Because of presence of capacitive coupling between the opaque metal film and the pixel electrode layer, the pixel electrode layer is subjected to potential modulation in response to the spread of the potential modulation of the opaque metal film. This again results in disturbance of the horizontal electric field applied to the liquid crystal layer. Such disturbance of the transversal electric field causes the nonuniformity in luminance to occur.

In view of the above, Japanese Unexamined Patent Publication (JP-A) No. 230074/1995 discloses the use of a nonconductive resin film as a light-shielding film formed in the second substrate portion. In other words, the above-mentioned opaque metal film is replaced by the nonconductive resin film in order to avoid the occurrence of the capacitive coupling. However, in order to achieve a light-shielding effect equivalent to that obtained by the opaque metal film, the resin film must have a thickness on the order of ten times that of the opaque metal film. Such a thick resin film provides a large unevenness between the surface of the resin film and the surface of the second glass substrate without the resin film. This brings about disclination of the liquid crystals and resultant occurrence of an afterimage.

SUMMARY OF THE INVENTION

It is an object of this invention to provide a liquid crystal display capable of providing high-fidelity display in any color and in any shape without causing nonuniformity in luminance.

An active matrix liquid crystal display to which this invention is applicable comprises first and second substrate portions arranged opposite to each other with a predetermined space left therebetween, and a liquid crystal layer held between the first and the second substrate portions. The first substrate portion comprises a first glass substrate having an inner surface faced to the liquid crystal layer and provided with a common electrode layer, a scanning signal line layer, a video signal line layer, a pixel electrode layer, and a plurality of thin film transistors. The scanning signal line layer comprises a plurality of scanning signal lines extending in a first direction in parallel to one another. The video signal line layer comprises a plurality of video signal lines extending in a second direction perpendicular to the first direction in parallel to one another. The pixel electrode layer comprises a plurality of pixel electrodes each of which is arranged in an area defined between every adjacent ones of the video signal lines and between every adjacent ones of the scanning signal lines. Each of the thin film transistors is connected to one of the scanning signal lines, one of the video signal lines, and one of the pixel electrodes. The first substrate portion further comprises a first orientation film formed over the inner surface of the first glass substrate and a first polarization plate formed over an outer surface of the first glass substrate. The second substrate portion comprises a second glass substrate having an inner surface faced to the liquid crystal layer, a light-shielding opaque metal film arranged on the inner surface of the second glass substrate in a matrix pattern, a second orientation film formed over the inner surface of the second glass substrate, and a second polarization plate formed over an outer surface of the second glass substrate. According to this invention, the opaque metal film in the second substrate portion is split into a plurality of film pieces closely adjacent to one another but electrically isolated from one another so that each frame in the matrix pattern is defined by two pairs of opposite ones of the film pieces.

Advantageously, a gap between every adjacent ones of the film pieces adjacent in the first direction is located on each of the video signal lines and has a width smaller than that of each video signal line.

Advantageously, the liquid crystal display further comprises a nonconductive opaque resin film piece formed in a gap between every adjacent ones of the film pieces adjacent in the first direction.

Advantageously, the gap between every adjacent ones of the film pieces adjacent in the first direction is located above a space between each pixel electrode of the pixel electrode layer and each video signal line of the video signal line layer.

According to this invention, there is also provided with an active matrix liquid crystal display comprising first and second substrate portions arranged opposite to each other with a predetermined space left therebetween, and a liquid crystal layer held between the first and the second substrate portions. The second substrate portion comprises a light-shielding opaque metal film which is arranged in a matrix pattern having a plurality of frames and which is split into a plurality of film pieces electrically isolated from one another so that each frame in the matrix pattern is defined by two pairs of opposite ones of the film pieces.

Advantageously, the first substrate portion comprises a first glass substrate and a plurality of thin film transistors on the first glass substrate.

Advantageously, the second substrate portion further comprises a second glass substrate with the film pieces formed on the second glass substrate.

BRIEF DESCRIPTION OF THE DRAWINGS

FIGS. 5A and 5B shows electric potentials of video signal lines illustrated in FIG. 4;

FIGS. 9A through 9C show electric potentials in an opaque metal film at three points in FIG. 4, respectively;

FIGS. 13A through 13C show electric potentials in an opaque metal film in FIG. 10 at the three points in FIG. 4;

DESCRIPTION OF THE PREFERRED EMBODIMENTS

Figure 1:
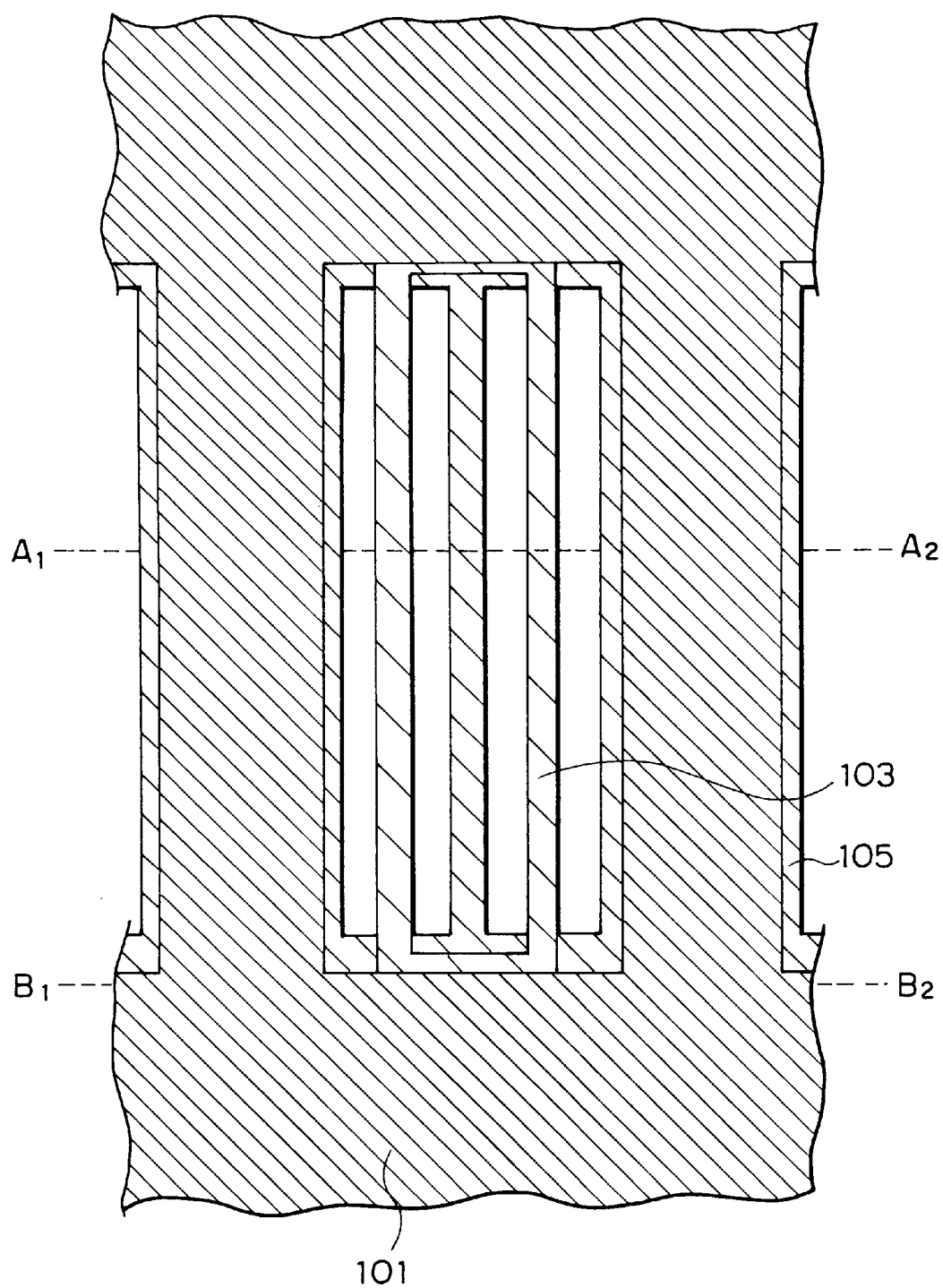
FIG. 1 is a plan view of a conventional liquid crystal display in a unit pixel portion.

In order to facilitate an understanding of this invention, description will at first be made about a conventional liquid crystal display with reference to the drawing.

Figure 2:
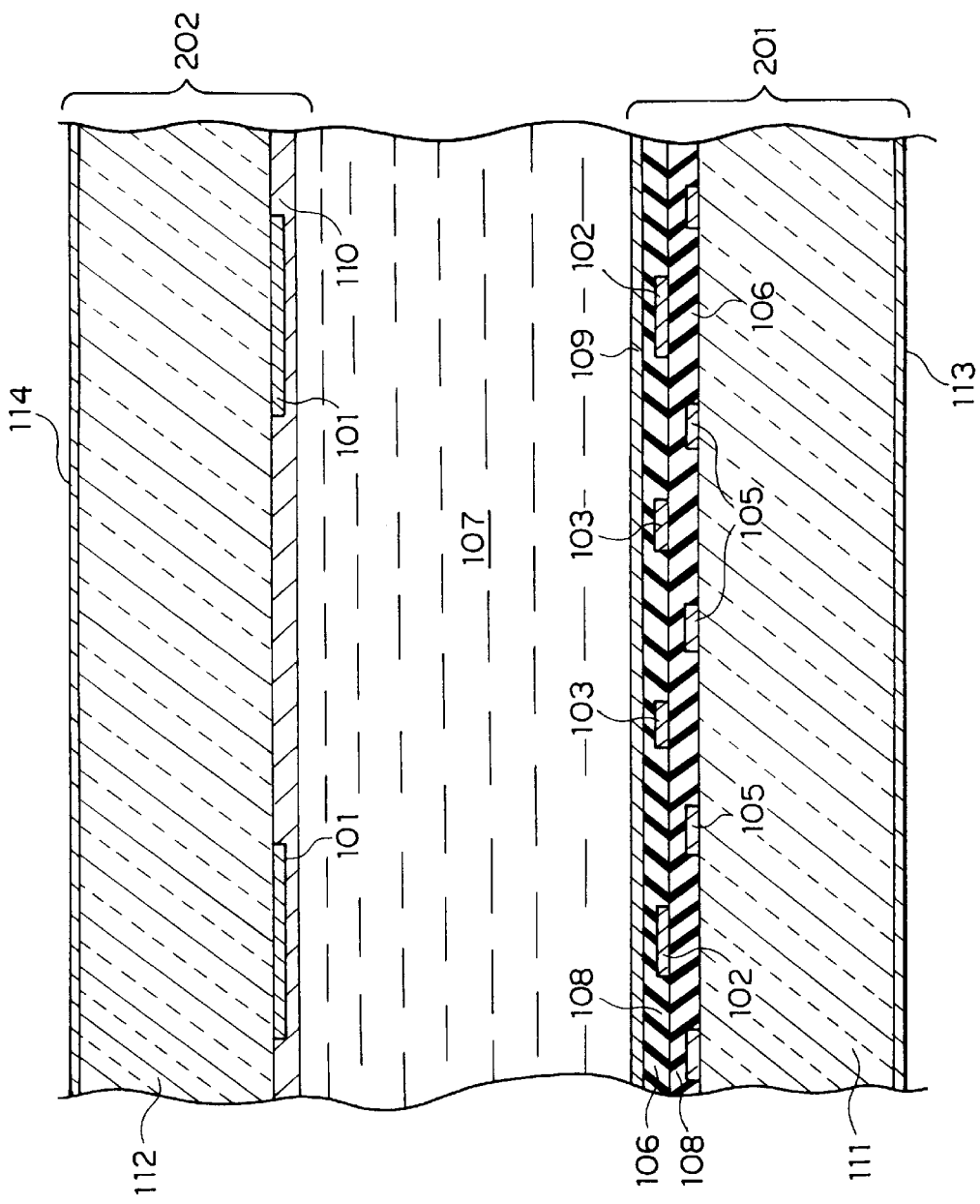
FIG. 2 is a sectional view taken along a line A1–A2 in FIG. 1.

Referring to FIGS. 1 and 2, the conventional liquid crystal display comprises a first substrate portion 201 with thin film transistors formed therein, a second substrate portion 202 opposite to the first substrate portion 201, and a liquid crystal layer 107 held between the first and the second substrate portions 201 and 202.

The first substrate portion 201 comprises a first glass substrate 111. A common electrode layer 105 is formed or patterned on an inner surface of the first glass substrate 111 that faces the liquid crystal layer 107. An insulator film 106 is formed over the inner surface of the first glass substrate 111 and the common electrode layer 105. On the insulator film 106, a video signal line layer 102 and a pixel electrode layer 103 are formed in a predetermined pattern. A protective insulator film 108 is formed over the insulator film 106, the video signal line layer 102, and the pixel electrode layer 103. Over the protective insulator film 108, a first orientation film 109 is formed to cause orientation in the liquid crystal layer 107. The first orientation film 109 is prepared by rubbing treatment in a predetermined rubbing direction.

On the other hand, the second substrate portion 202 comprises a second glass substrate 112. A light-shielding opaque metal film 101 is formed in a matrix pattern on an inner surface of the second glass substrate 112 that faces the liquid crystal layer 107 (in the figure, the light-shielding opaque metal film 101 is illustrated "under" the second glass substrate 112). A second orientation film 110 is formed over the inner surface of the second glass substrate 112 and the opaque metal film 101. The second orientation film 110 serves to cause orientation in the liquid crystal layer 107 and is prepared by rubbing treatment in the predetermined rubbing direction like the first orientation film 109. The opaque metal film 101 formed in the matrix pattern serves to prevent leakage of light in the liquid crystal display and is often called a black matrix.

Liquid crystals are confined between the first and the second substrate portions 201 and 202 to form the liquid crystal layer 107. Finally, a first polarization plate 113 is attached to an outer surface of the first glass substrate 111 with its transmission axis coincident with the predetermined rubbing direction. On the other hand, a second polarization plate 114 is attached to an outer surface of the second glass substrate 112 with its transmission axis perpendicular to that of the first polarization plate 113.

Next, description will be made as regards operation of the liquid crystal display having the above-mentioned structure.

Figure 3:
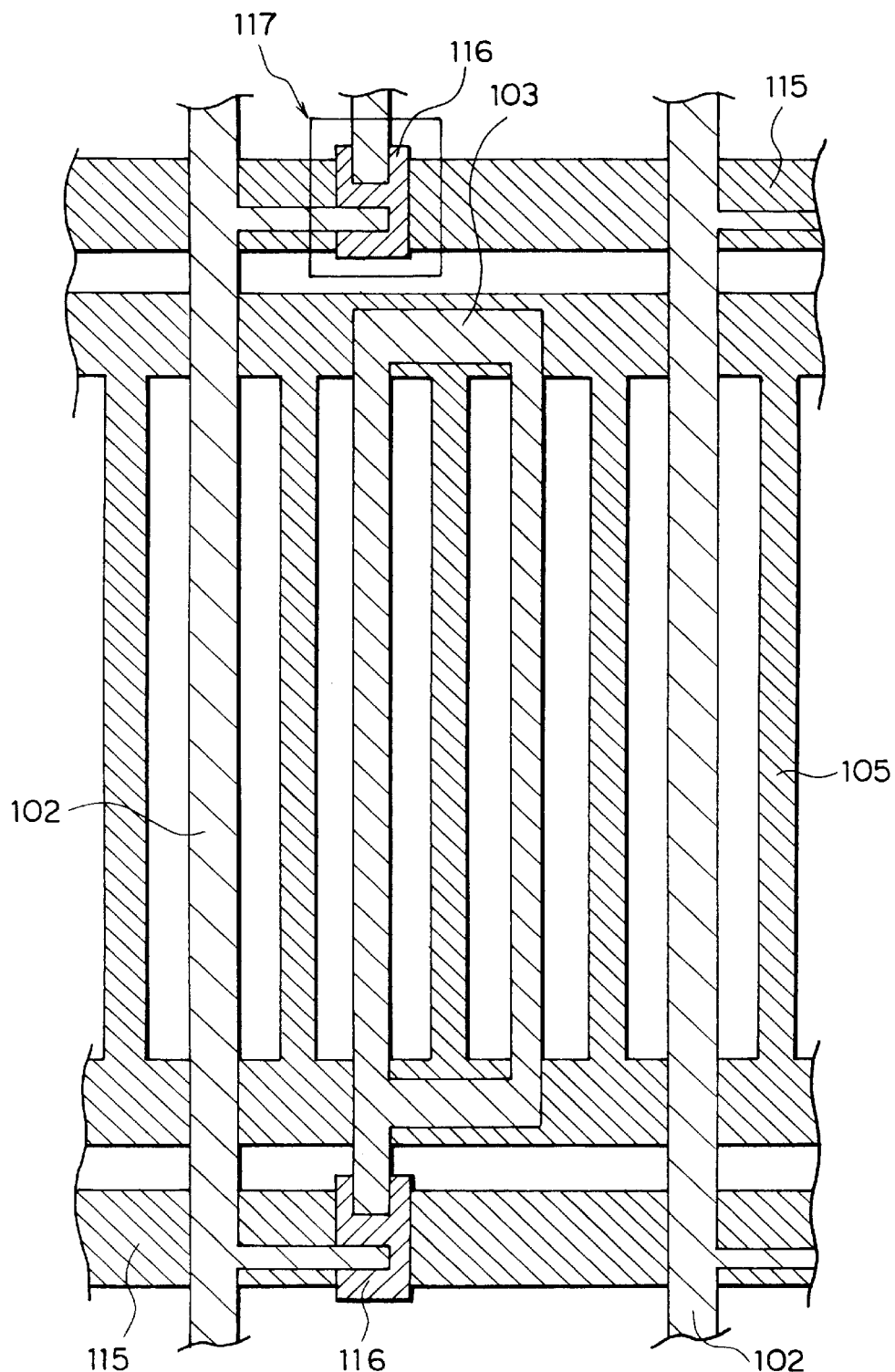
FIG. 3 is a plan view of a first substrate portion in the unit pixel portion illustrated in FIG. 1.

Referring to FIG. 3, the first substrate portion 201 further comprises a scanning signal line layer 115 and a plurality of thin film transistors 117 including a semiconductor layer 116. The scanning signal line layer 115 comprises a plurality of scanning signal lines extending in a first direction. On the other hand, the video signal line layer 102 comprises a plurality of video signal lines extending in a second direction perpendicular to the first direction. The pixel electrode layer 103 comprises a plurality of pixel electrodes connected to the thin film transistors 117 in one-to-one correspondence. Each of the thin film transistors 117 is connected to one of the scanning signal lines and one of the video signal lines. In response to an ON/OFF signal from the scanning signal line layer 115, each of the thin film transistors 117 including the semiconductor layer 116 is turned on and off. When a particular one of the thin film transistors 117 is turned on, electric charges flow from a corresponding one of the video signal lines to a corresponding one of the pixel electrodes. In response, those liquid crystals in a corresponding part of the liquid crystal layer 107 are activated. Even after the thin film transistor 117 is turned off, the electric charges flowing into the corresponding pixel electrode are maintained to keep a certain electric potential. Therefore, the liquid crystals are kept activated. On the other hand, the common electrode layer 105 is continuously applied with a constant d.c. voltage.

The above-mentioned conventional liquid crystal display is disadvantageous as described in the following.

Figure 4:
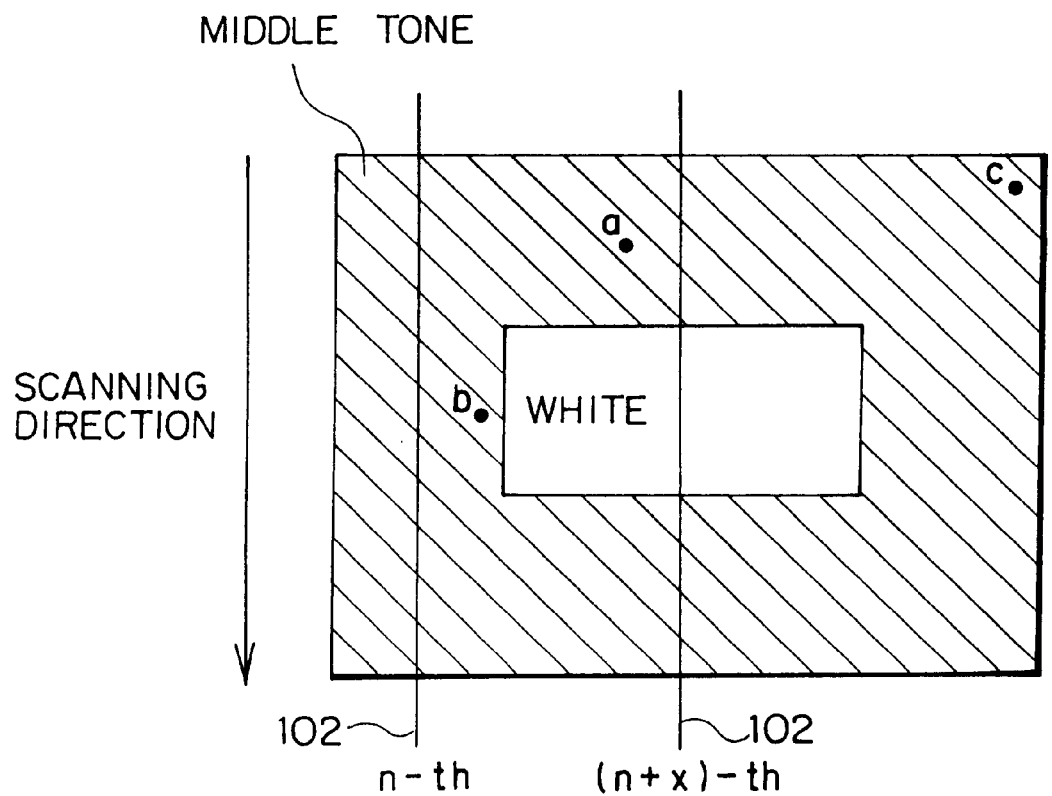
FIG. 4 shows an example of a display screen in the conventional liquid crystal display.

Referring to FIG. 4, consideration will be made about the case where a white window on a middle tone background is displayed. In this event, nonuniformity in luminance is caused in the middle tone background. Specifically, local difference in luminance is caused to occur although the uniform luminance is intended throughout the middle tone background. For example, the local difference in luminance appears among three points a, b, and c in FIG. 4 as represented by a>b >c. Such nonuniformity in luminance occurs in the manner which will hereafter be described.

As illustrated in FIG. 4, an (n+x)-th video signal line of the video signal line layer 102 contributes to display of both the middle tone background and the white window. On the other hand, an n-th video signal line of the video signal line layer 102 contributes to display of the middle tone background alone. The (n+x)-th and the n-th video signal lines have electric potentials illustrated in FIGS. 5A and 5B, respectively.

Figure 6:
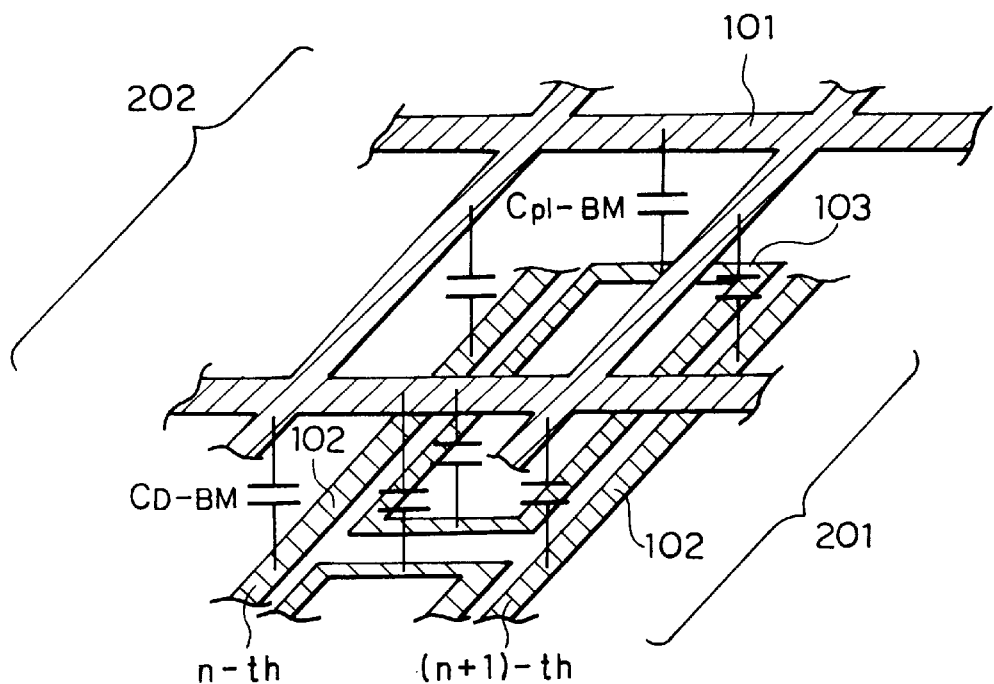
FIG. 6 is a schematic perspective view for describing capacitive coupling in the conventional liquid crystal display.
Figure 7:
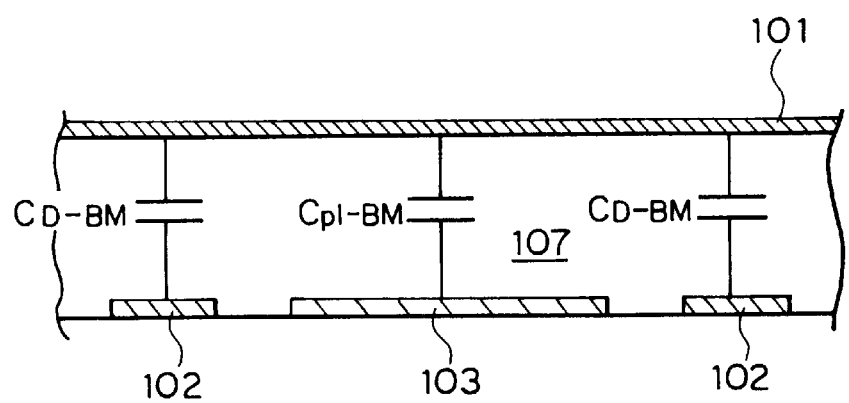
FIG. 7 is a schematic sectional view taken along a line B1–B2 in FIG. 1 for describing the capacitive coupling in the conventional liquid crystal display.
Figure 8:
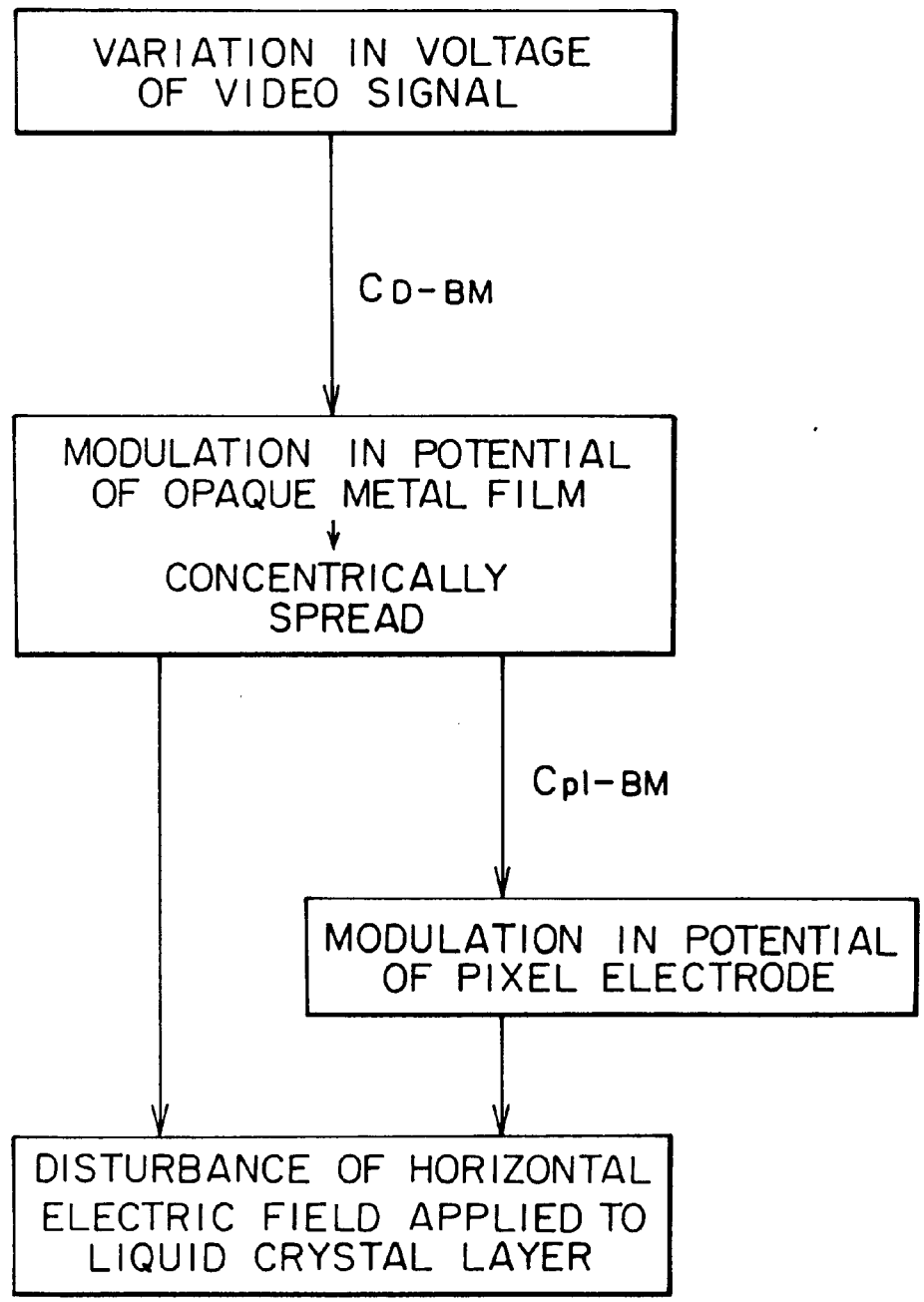
FIG. 8 is a flow chart for describing the deterioration in picture quality in the conventional liquid crystal display.
Figure 10:
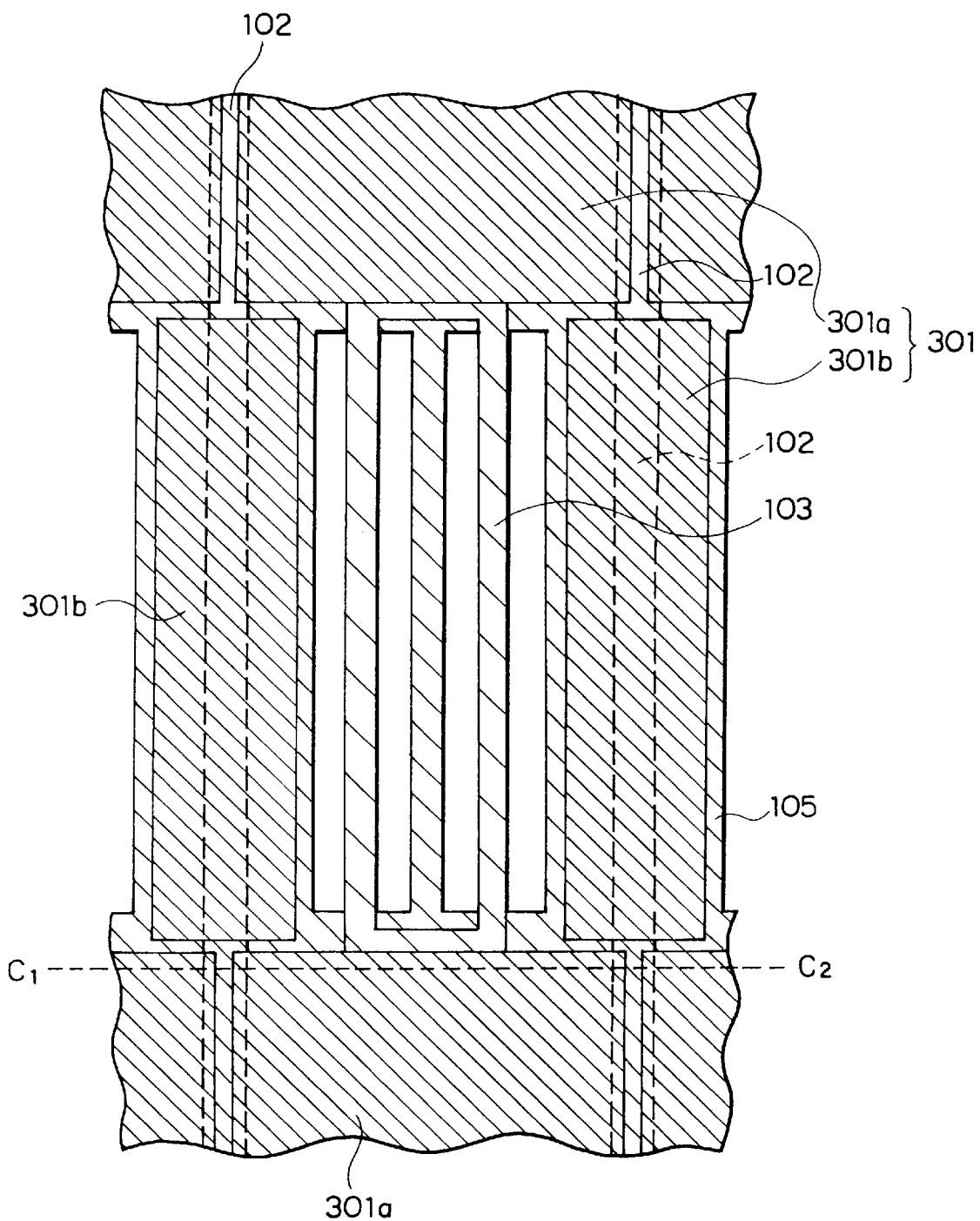
FIG. 10 is a plan view of a liquid crystal display in a unit pixel portion according to a first embodiment of this invention.

Referring to FIGS. 6 and 7, capacitive coupling $C_{D\text{-}BM}$ is present between the video signal line layer 102 and the opaque metal film 101. Therefore, the opaque metal film 101 is subjected to potential modulation following potential variation of a video signal. This results in disturbance of a horizontal electric field applied to the liquid crystal layer 107. Since the opaque metal film 101 is formed in the matrix pattern, the potential modulation concentrically spreads around a modulation point. Because of presence of capacitive coupling between the opaque metal film 101 and the pixel electrode layer 103, the pixel electrode layer 103 is subjected to potential modulation in response to the spread of the potential modulation of the opaque metal film 101. This again results in disturbance of the horizontal electric field applied to the liquid crystal layer 107. The electric potentials in the opaque metal film 101 at the three points a, b, and c in FIG. 4 are illustrated in FIGS. 9A, 9B, and 9C, respectively. Such disturbance of the transversal electric field causes the nonuniformity in luminance to occur. The above-mentioned mechanism is illustrated in a flow chart in FIG. 8.

In view of the above, Japanese Unexamined Patent Publication (JP-A) No. 230074/1995 discloses the use of a nonconductive resin film as a light-shielding film formed in the second substrate portion. In other words, the above-mentioned opaque metal film is replaced by the nonconductive resin film in order to avoid the occurrence of the capacitive coupling. However, in order to achieve a light-shielding effect equivalent to that obtained by the opaque metal film, the resin film must have a thickness on the order of ten times that of the opaque metal film. Such a thick resin film provides a large unevenness between the surface of the resin film and the surface of the second glass substrate without the resin film. This brings about disclination of the liquid crystals and resultant occurrence of an afterimage.

Now, description will be made about this invention in conjunction with preferred embodiments thereof.

First Embodiment

An active matrix liquid crystal display of an IPS type according to a first embodiment of this invention is basically similar in structure to the conventional liquid crystal display described in the foregoing. Similar parts are designated by like reference numerals and will be neither described in detail nor illustrated in the figure. In the following description, reference will be made back, if necessary, to any of those drawing figures used in describing the prior art.

Like the conventional liquid crystal display illustrated in FIGS. 1 and 2, the active matrix liquid crystal display according to the first embodiment comprises a first substrate portion and a second substrate portion arranged opposite to each other with a predetermined space therebetween, and a liquid crystal layer held between the first and the second substrate portions.

The first substrate portion comprises a first glass substrate with a common electrode layer 105, a video signal line layer 102, a scanning signal line layer, thin film transistors (TFTs), and a pixel electrode layer 103 all of which are formed on an inner surface of the first glass substrate in a predetermined pattern, a first orientation film formed over the inner surface of the first glass substrate, and a first polarization plate attached over an outer surface of the first glass substrate.

The second substrate portion comprises a second glass substrate, a light-shielding opaque metal film or a black matrix 301 arranged on an inner surface of the second glass substrate in a matrix pattern, a second orientation film formed over the inner surface of the second glass substrate, and a second polarization plate attached over an outer surface of the second glass substrate.

In this embodiment, the opaque metal film 301 in the matrix pattern is split into a plurality of first and second film pieces 301a and 301b electrically isolated from one another. The first film pieces 301a are arranged directly adjacent to one another in a plurality of rows in a first direction. The second film pieces 301b are arranged in a plurality of columns in a second direction perpendicular to the first direction with the first film pieces 301 interposed. Each rectangular frame or lattice-shaped area of the matrix pattern is defined by a combination of two opposite ones of the first film pieces 301a and two opposite ones of the second film pieces 301b. Each of the first and the second film pieces 301a and 301b is shared by two adjacent frames. A gap between every adjacent ones of the first film pieces 301a is light-shielded by the video signal line layer 102, which is opaque, formed on the first glass substrate. Likewise, a gap between every adjacent pair of the first and the second film pieces 301a and 301b is light-shielded by the common electrode layer 105 which is opaque. Therefore, no leakage of light occurs from those gaps.

Referring back to FIGS. 4, 5A, and 5B, consideration will again be made about display of a white window on a middle tone background. An (n+x)-th video signal line of the video signal line layer 102 contributes to display of both the white window and the middle tone background. An n-th video signal line of the video signal line layer 102 contributes to display of the middle tone background alone. The (n+x)-th and the n-th video signal lines have electric potentials illustrated in FIGS. 5A and 5B, respectively.

Figure 11:
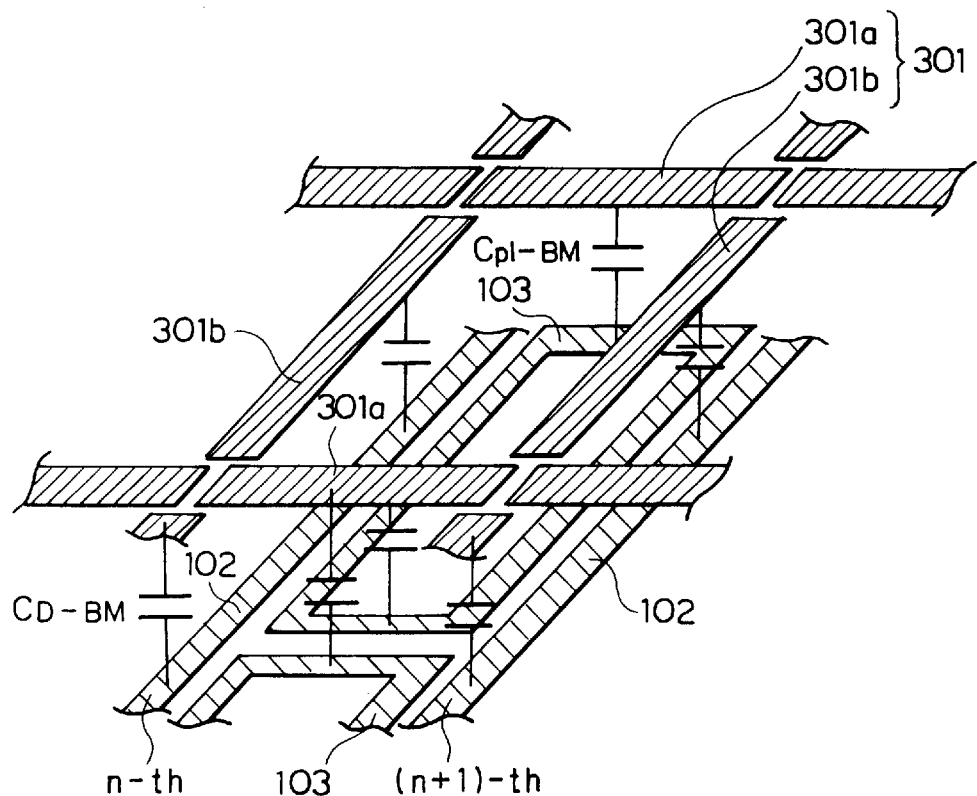
FIG. 11 is a schematic perspective view for describing capacitive coupling in the liquid crystal display illustrated in FIG. 10.
Figure 12:
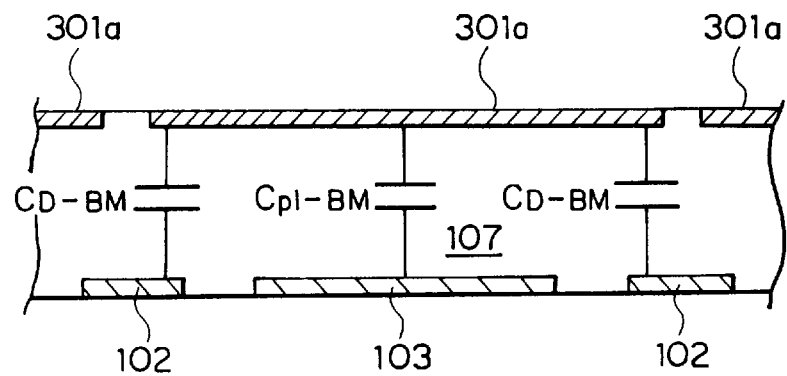
FIG. 12 is a schematic sectional view taken along a line C1–C2 in FIG. 10 for describing the capacitive coupling in FIG. 11.
Figure 14:
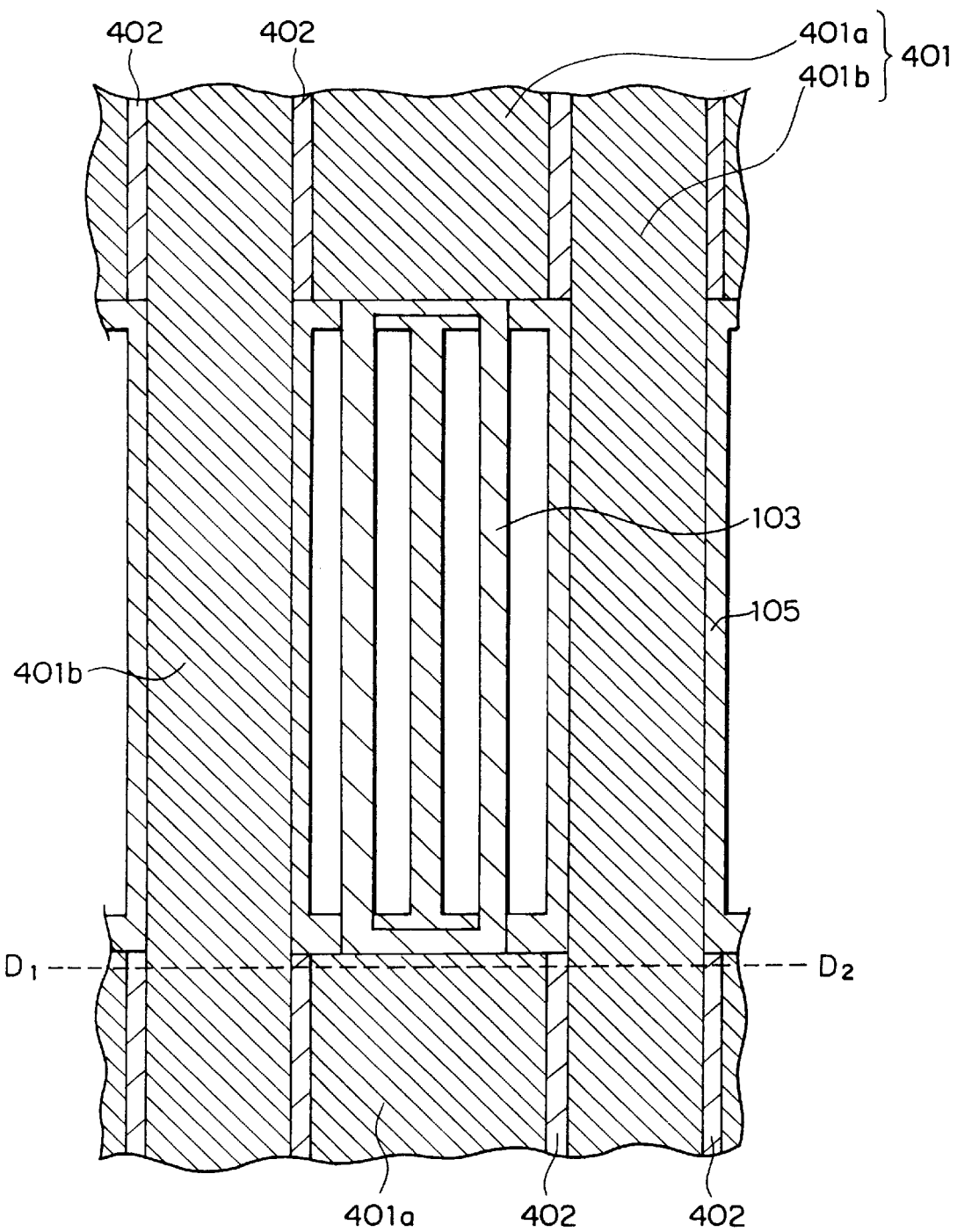
FIG. 14 is a plan view of a liquid crystal display according to a second embodiment of this invention in a unit pixel portion.

Referring to FIGS. 11 and 12, capacitive coupling is present between the first and the second substrate portions, like in the conventional liquid crystal display. However, each of the video signal lines of the video signal line layer 102 and each of the first film pieces 301a face each other over a smaller area as compared with the conventional liquid crystal display. This is because the gap is present between every adjacent ones of the first film pieces 301a. Therefore, capacitive coupling $C_{D\text{-}BM}$ between each video signal line and each of the first film pieces 301a has a small value. This reduces the magnitude of potential modulation of the first film pieces 301a following potential variation of the video signal lines. As a result, a horizontal electric field applied to the liquid crystal layer 107 is hardly disturbed. Moreover, the opaque metal film 301 is split into the first and the second film pieces 301a and 301b as described above. With this structure, even if the potential modulation occurs in any one of the first and the second film pieces 301a and 301b, such potential modulation is inhibited from concentrically spreading around a modulation point. As far as the potential modulation does not spread in the opaque metal film 301, the pixel electrode layer 103 is prevented from potential modulation even in presence of capacitive coupling $C_{pi\text{-}BM}$ between the pixel electrodes of the pixel electrode layer 103 and the first film pieces 301a. Thus, the horizontal electric field applied to the liquid crystal layer 107 is hardly disturbed. In this case, three points a, b, and c (FIG. 4) of the opaque metal film 301 have electric potentials illustrated in FIGS. 13A, 13B, and 13C, respectively.

As described above, in the liquid crystal display according to the first embodiment, the capacitive coupling between the video signal line layer and the opaque metal film is suppressed and the opaque metal film is split into a plurality of the film pieces. Therefore, upon display in any color and in any shape, the horizontal electric field applied to the liquid crystal layer is hardly disturbed. Thus, high-fidelity display is possible without nonuniformity in luminance.

Second Embodiment

An active matrix liquid crystal display of an IPS type according to a second embodiment of this invention is basically similar in structure to the conventional liquid crystal display and the first embodiment. Similar parts are designated by like reference numerals and will be neither described in detail nor illustrated in the figure. In the following description, reference will be made back again, if necessary, to any of the drawing figures used in describing the prior art and the first embodiment.

Like the conventional liquid crystal display illustrated in FIGS. 1 and 2, the active matrix liquid crystal display according to the second embodiment comprises a first substrate portion and a second substrate portion arranged opposite to each other with a predetermined space therebetween, and a liquid crystal layer held between the first and the second substrate portions.

The first substrate portion comprises a first glass substrate with a common electrode layer 105, a video signal line layer 102, a scanning signal line layer, thin film transistors (TFTs), and a pixel electrode layer 103 all of which are formed on an inner surface of the first glass substrate in a predetermined pattern, a first orientation film formed over the inner surface of the first glass substrate, and a first polarization plate attached over an outer surface of the first glass substrate.

The second substrate portion comprises a second glass substrate, a light-shielding opaque metal film or a black matrix 401 arranged on an inner surface of the second glass substrate in a matrix pattern, a second orientation film formed over the inner surface of the second glass substrate, and a second polarization plate attached over an outer surface of the second glass substrate.

In this embodiment, the opaque metal film 401 in the matrix pattern is split into a plurality of first and second film pieces 401a and 401b electrically isolated from one another. The first film pieces 401a are arranged in a plurality of rows in a first direction with the second film pieces 401b interposed. The second film pieces 401b are arranged in a plurality of columns in a second direction perpendicular to the first direction and uninterruptedly extend in each column as a single long strip. Each rectangular frame of the matrix pattern is defined by a combination of two opposite ones of the first film pieces 401a and two opposite ones of the second film pieces 401b. Each of the first and the second film pieces 401a and 401b is shared by two adjacent frames. A gap between every adjacent pair of the first and the second film pieces 401a and 401b is shielded by a nonconductive opaque resin film piece 402. The opaque resin film piece 402 serves to prevent leakage of light from the gap.

Referring back to FIGS. 4, 5A, and 5B, consideration will again be made about display of a white window on a middle tone background. An (n+x)-th video signal line of the video signal line layer 102 contributes to display of both the white window and the middle tone background. An n-th video signal line of the video signal line layer 102 contributes to display of the middle tone background alone. The (n+x)-th and the n-th video signal lines have electric potentials illustrated in FIGS. 5A and 5B, respectively.

Figure 15:
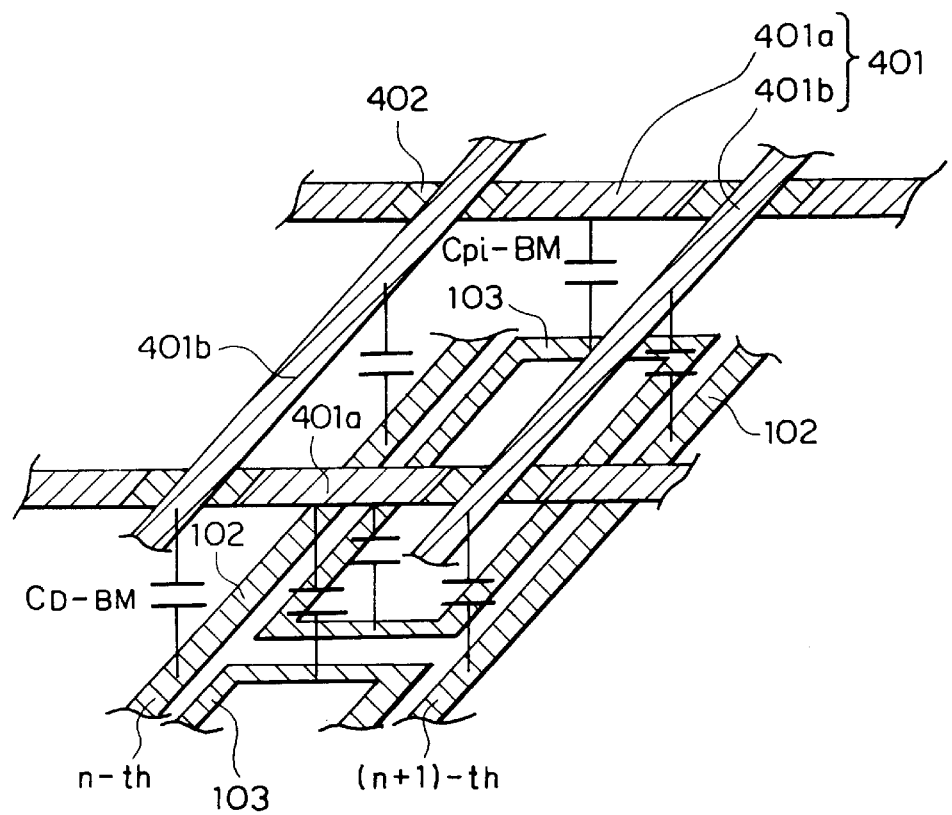
FIG. 15 is a schematic perspective view for describing capacitive coupling in the liquid crystal display illustrated in FIG. 14.
Figure 16:
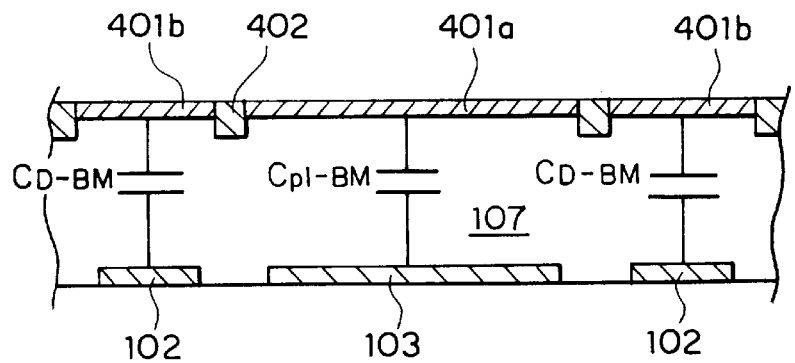
FIG. 16 is a schematic sectional view taken along a line D1–D2 in FIG. 14 for describing the capacitive coupling in FIG. 15.

Referring to FIGS. 15 and 16, capacitive coupling is present between the first and the second substrate portions, like in the conventional liquid crystal display. However, the gap between every adjacent pair of the first and the second film pieces 401a and 401b is located above a space between each pixel electrode of the pixel electrode layer 103 and each video signal line of the video signal line layer 102. Therefore, although capacitive coupling $C_{D-BM}$ is present between the video signal lines and the second film pieces 401b, no substantial capacitive coupling is present between the video signal lines and the first film pieces 401a facing the pixel electrodes of the pixel electrode layer 103. Moreover, the opaque metal film 401 is split into the first and the second film pieces 401a and 401b as described above. With this structure, even if the potential modulation occurs in any one of the first and the second film pieces 401a and 401b, such potential modulation is inhibited from concentrically spreading around a modulation point. As far as the potential modulation does not spread in the opaque metal film 401, the pixel electrode layer 103 is prevented from potential modulation even in presence of capacitive coupling $C_{pi-BM}$ between the pixel electrodes of the pixel electrode layer 103 and the first film pieces 401a. Thus, the horizontal electric field applied to the liquid crystal layer 107 is more hardly disturbed as compared with the first embodiment. In this case, the three points a, b, and c (FIG. 4) of the opaque metal film 401 have electric potentials illustrated in FIGS. 13A, 13B, and 13C, respectively, like in the first embodiment.

As described above, in the liquid crystal display according to the second embodiment, the capacitive coupling between the video signal line layer and the first film pieces facing the pixel electrode layer is substantially equal to zero and the opaque metal film is split into a plurality of the film pieces. Therefore, upon display in any color and in any shape, the horizontal electric field applied to the liquid crystal layer is more hardly disturbed as compared with the first embodiment. Thus, high-fidelity display is possible without nonuniformity in luminance.

The nonconductive opaque resin film piece 402 formed between every adjacent pair of the first and the second film pieces 401a and 401b in the second substrate portion has a relatively small area. Therefore, no disclination is caused to occur so that occurrence of an afterimage is avoided.

As described above, the liquid crystal display according to this invention provides high-fidelity display in any color and in any shape without causing nonuniformity in luminance.

What is claimed is:

1. An active matrix liquid crystal display of an in-phane switching type comprising first and second substrate portions arranged opposite to each other with a predetermined space left therebetween, and a liquid crystal layer held between said first and said second substrate portions;

said first substrate portion comprising:

a first glass substrate having an inner surface faced to said liquid crystal layer and provided with a common electrode layer, a scanning signal line layer, a video signal line layer, a pixel electrode layer, and a plurality of thin film transistors, said scanning signal line layer comprising a plurality of scanning signal lines extending in a first direction in parallel to one another, said video signal line layer comprising a plurality of video signal lines extending in a second direction perpendicular to said first direction in parallel to one another, said pixel electrode layer comprising a plurality of pixel electrodes each of which is arranged in an area defined between every adjacent ones of said video signal lines and between every adjacent ones of said scanning signal lines, each of said thin film transistors being connected to one of said scanning signal lines, one of said video signal lines, and one of said pixel electrodes; and a first orientation film formed over the inner surface of said first glass substrate;

said second glass substrate having an inner surface faced to said liquid crystal layer; a light-shielding opaque metal film arranged on the inner surface of said second glass substrate in a matrix pattern;

a second orientation film formed over the inner surface of said second glass substrate;

wherein said opaque metal film in said second substrate portion is split into a plurality of film pieces closely adjacent to one another and electrically isolated from one another so that each frame in the matrix pattern is defined by two pairs of opposite ones of said film pieces; and wherein said liquid crystal display further comprises a nonconductive opaque resin film piece formed in a gap between every adjacent ones of said film pieces adjacent in said first direction.

2. A liquid crystal display as claimed in claim 1, wherein said gap between every adjacent ones of said film pieces adjacent in said first direction is located above a space between each pixel electrode of said pixel electrode layer and each video signal line of said video signal line layer.

3. An active matrix liquid crystal display comprising first and second substrate portions arranged opposite to each other with a predetermined space left therebetween, and a liquid crystal layer held between said first and said second substrate portions;

said second substrate portion comprising:

a light-shielding opaque metal film arranged in a matrix pattern having a plurality of frames and split into a plurality of film pieces electrically isolated from one another so that each frame in the matrix pattern is defined by two pairs of opposite ones of said film pieces;

wherein said film pieces extend in a first direction and a second direction, in which said first and second directions are perpendicular to each other, and wherein said second substrate portion further comprises a nonconductive opaque resin film piece formed in a gap between adjacent ones of said film pieces adjacent in said first direction.

4. A liquid crystal display as claimed in claim 3, wherein said first substrate portion comprises:
a first glass substrate; and
a plurality of thin film transistors on said first glass substrate.

5. A liquid crystal display as claimed in claim 4, wherein said second substrate portion further comprises:
a second glass substrate;
said film pieces being formed on said second glass substrate.

6. An active matrix liquid crystal display of an in-plane switching type comprising first and second substrate portions arranged opposite to each other with a predetermined space left therebetween, and a liquid crystal layer held between said first and said second substrate portions;
said first substrate portion comprising:
a first glass substrate having an inner surface faced to said liquid crystal layer and provided with a common electrode layer, a scanning signal line layer, a video signal line layer, a pixel electrode layer, and a plurality of thin film transistors, said scanning signal line layer comprising a plurality of scanning signal lines extending in a first direction in parallel to one another, said video signal line layer comprising a plurality of video signal lines extending in a second direction perpendicular to said first direction in parallel to one another, said pixel electrode layer comprising a plurality of pixel electrodes each of which is arranged in an area defined between every adjacent ones of said video signal lines and between every adjacent ones of said scanning signal lines, each of said thin film transistors being connected to one of said scanning signal lines, one of said video signal lines, and one of said pixel electrodes; and
a first orientation film formed over the inner surface of said first glass substrate;
said second glass substrate having an inner surface faced to said liquid crystal layer; a light-shielding opaque metal film arranged on the inner surface of said second glass substrate in a matrix pattern; and
a second orientation film formed over the inner surface of said second glass substrate;
wherein said opaque metal film in said second substrate portion is split into a plurality of film pieces closely adjacent to one another and electrically isolated from one another so that each frame in the matrix pattern is defined by two pairs of opposite ones of said film pieces; and
wherein each one of said video signal lines overlaps a gap, said gap being between adjacent ones of said film pieces in said first direction.

7. A liquid crystal display as claimed in claim 6, wherein said gap between every adjacent ones of said film pieces adjacent in said first direction is aligned with each of said video signal lines and has a width smaller than that of each video signal line.

8. An active matrix liquid crystal display comprising first and second substrate portions arranged opposite to each other with a predetermined space left therebetween, and a liquid crystal layer held between said first and said second substrate portions;
said first substrate portion comprising;
a first glass substrate and a video signal line layer formed on said first substrate portion, said video signal line layer comprising a plurality of video signal lines;
said second substrate portion comprising:
a light-shielding opaque metal film arranged in a matrix pattern having a plurality of frames and split into a plurality of film pieces electrically isolated from one another so that each frame in the matrix pattern is defined by two pairs of opposite ones of said film pieces;
wherein said two pairs of said opposite ones of said film pieces extend in a first direction and second direction, in which said first and second directions are perpendicular to each other, and said plurality of video signal lines extend in said second direction; and
wherein each one of said video signal lines overlaps a gap, said gap being between adjacent ones of said film pieces in said first direction.

9. A liquid crystal display as claimed in claim 8,
wherein said first substrate portion further comprises
a plurality of thin film transistors on said first glass substrate.

10. A liquid crystal display as claimed in claim 9, wherein said second substrate portion further comprises:
a second glass substrate;
said film pieces being formed on said second glass substrate.

* * * * *